US012334676B2

(12) United States Patent
Hsu et al.

(10) Patent No.: US 12,334,676 B2
(45) Date of Patent: Jun. 17, 2025

(54) PLUG CONNECTOR AND ELECTRICAL CONNECTOR ASSEMBLY INCLUDING THE PLUG CONNECTOR

(71) Applicant: Cheng Uei Precision Industry Co., LTD., New Taipei (TW)

(72) Inventors: Li-Nien Hsu, New Taipei (TW); Sheng-Nan Yu, New Taipei (TW)

(73) Assignee: CHENGDU UEI PRECISION INDUSTRY CO., LTD., New Taipei (TW)

(*) Notice: Subject to any disclaimer, the term of this patent is extended or adjusted under 35 U.S.C. 154(b) by 357 days.

(21) Appl. No.: 18/114,217

(22) Filed: Feb. 24, 2023

(65) Prior Publication Data

US 2023/0369803 A1 Nov. 16, 2023

(30) Foreign Application Priority Data

May 13, 2022 (CN) ......................... 202221163121.4

(51) Int. Cl.

*H01R 13/639* (2006.01)
*H01R 13/629* (2006.01)
*H01R 103/00* (2006.01)

(52) U.S. Cl.

CPC ..... *H01R 13/62938* (2013.01); *H01R 13/639* (2013.01); *H01R 2103/00* (2013.01)

(58) Field of Classification Search

CPC ........................ H01R 13/62938; H01R 13/639
See application file for complete search history.

(56) References Cited

U.S. PATENT DOCUMENTS

| | | | | |
|---|---|---|---|---|
| 5,401,179 A * | 3/1995 | Shinchi | H01R 13/62933 439/372 |
| 6,439,902 B1 * | 8/2002 | Cole | H01R 13/62938 439/157 |
| 6,602,082 B2 * | 8/2003 | Nishide | H01R 13/62955 439/157 |
| 7,438,570 B2 * | 10/2008 | Mori | H01R 13/62933 439/157 |
| 9,130,324 B2 * | 9/2015 | Furuya | H01R 24/005 |
| 10,326,237 B1 * | 6/2019 | Campos | H01R 24/84 |
| 2023/0369803 A1 * | 11/2023 | Hsu | H01R 13/62938 |

* cited by examiner

*Primary Examiner* — Neil Abrams
(74) *Attorney, Agent, or Firm* — Cheng-Ju Chiang

(57) ABSTRACT

An electrical connector assembly includes a socket connector, and a plug connector connected with the socket connector. The socket connector includes a base body, two socket terminals mounted in the base body, and two buckling blocks disposed at two outer side surfaces of the base body. The plug connector includes a main body, two plug terminals mounted in the main body, a buckling lever, two buckling slots, two blocking slots, two limiting blocks and two torsion springs. The buckling lever has two buckling portions rotatably connected to the main body. The two buckling slots are disposed at the two buckling portions. The two blocking slots are disposed at two sides of an outer surface of the main body. The two limiting blocks are movable pivoted to the two buckling portions. The limiting blocks in initial position serve to prevent mistaken movement of the buckling lever and to allow such movement of the buckling lever when appropriate for mating with a socket.

17 Claims, 7 Drawing Sheets

PLUG CONNECTOR AND ELECTRICAL CONNECTOR ASSEMBLY INCLUDING THE PLUG CONNECTOR

CROSS-REFERENCE TO RELATED APPLICATION

The present application is based on, and claims priority from, China Patent Application No. 202221163121.4, filed May 13, 2022, the disclosure of which is hereby incorporated by reference herein in its entirety.

BACKGROUND OF THE INVENTION

1. Field of the Invention

The present invention generally relates to a plug connector, and more particularly to an electrical connector assembly including the plug connector which is able to assure a position of a buckling lever of the plug connector to prevent blocking a connection of the electrical connector assembly by a mistaken touching.

2. The Related Art

With the popularity of electric vehicles, a design of a conventional electrical connector assembly with a high voltage and a high current has become an important issue of an electric vehicle industry development. The conventional electrical connector is easy to plug or unplug, and the conventional electrical connector is able to keep a stable connection. The conventional electrical connector assembly is applied in the electric vehicles. The conventional electrical connector assembly includes a socket connector and a plug connector. The conventional electrical connector assembly is generally provided with a buckling lever. In a usage process of the conventional electrical connector assembly, the plug connector is locked to the socket connector by the buckling lever to prevent the conventional electrical connector assembly from loosening.

However, the conventional electrical connector assembly lacks a structure for assuring a position of the buckling lever to prevent a mistaken touching, so when the conventional electrical connector assembly is assembled, the plug connector is failed to be successfully connected with the socket connector due to the buckling lever which is touched mistakenly, and in serious condition, the electrical connector assembly may be damaged.

Therefore, it is necessary to design an electrical connector assembly including a plug connector with the structure for preventing the mistaken touching, so that the plug connector is prevented from being failed to be connected with the socket connector due to a buckling lever of the plug connector of the electrical connector assembly which is touched mistakenly.

SUMMARY OF THE INVENTION

An object of the present invention is to provide an electrical connector assembly which prevents blocking a connection of the electrical connector assembly by a mistaken touching. The electrical connector assembly includes a socket connector and a plug connector. The socket connector includes a base body, two socket terminals mounted in the base body, and two buckling blocks disposed at two outer side surfaces of the base body. The plug connector is cooperated with the socket connector. The plug connector is connected with the socket connector. The plug connector includes a main body which is configured to be connected with the base body, two plug terminals mounted in the main body, a buckling lever, two buckling slots, two blocking slots, two limiting blocks and two torsion springs. The buckling lever has a grip and two buckling portions. The grip is connected between the two buckling portions. The two buckling portions are rotatably connected to two outer side surfaces of the main body. The two buckling slots are disposed at two inner surfaces of the two buckling portions which are adjacent to two sides of the socket connector. Each buckling slot includes a straight slot and an arc slot. A tail end of each straight slot is arched opposite to the grip to form the arc slot. A top of each buckling slot is defined as the straight slot extending to a front surface of one buckling portion, and the straight slot is connected to a front edge of the one buckling portion. The two straight slots are aligned with the two buckling blocks. When the socket connector is connected to the plug connector, the two buckling blocks of the socket connector are accommodated in the two straight slots. The two blocking slots are disposed at two sides of an outer surface of the main body. The two limiting blocks are rotatably connected to the two buckling portions. Each limiting block has an abutting end and a blocking end. A part of the abutting end is accommodated in one buckling slot, so each limiting block is pushed to rotate by one buckling block. Each torsion spring is connected between one limiting block and the one buckling portion. The two torsion springs exert two forces on the two blocking ends of the two limiting blocks to make the two blocking ends of the two limiting blocks be blocked in the two blocking slots. When the two abutting ends of the two limiting blocks are pushed by the two buckling blocks, the two blocking ends of the two limiting blocks rotate to move out of the two blocking slots.

Another object of the present invention is to provide an electrical connector assembly. The electrical connector assembly includes a socket connector and a plug connector. The socket connector includes a base body, two socket terminals mounted in the base body, and two buckling blocks disposed at two outer side surfaces of the base body. The plug connector is cooperated with the socket connector. The plug connector is connected with the socket connector. The plug connector includes a main body which is configured to be connected with the base body, two plug terminals mounted in the main body, a buckling lever, two buckling slots, two blocking slots, two limiting blocks and two torsion springs. The buckling lever has a grip and two buckling portions. The grip is connected between the two buckling portions. The two buckling portions are rotatably connected to two outer side surfaces of the main body. The two buckling slots are disposed at two inner surfaces of the two buckling portions which are adjacent to two sides of the socket connector. Two outer sides of the two buckling slots extend oppositely and expand outward to form two locking slots penetrating through two outer surfaces of the two buckling portions. Each buckling slot includes a straight slot and an arc slot. A tail end of each straight slot is arched opposite to the grip to form the arc slot. A top of each buckling slot is defined as the straight slot extending to a front surface of one buckling portion, and the straight slot is connected to a front edge of the one buckling portion. The two straight slots are aligned with the two buckling blocks. When the socket connector is connected to the plug connector, the two buckling blocks of the socket connector enter the two buckling slots through the two straight slots. The two buckling blocks are slidable in the two arc slots. Two free ends of the two buckling blocks project into the two locking slots. The two blocking slots are disposed at two sides of an outer surface of the main body. The two limiting blocks are rotatably connected to the two buckling portions. Each limiting block has an abutting end and a blocking end. A part of the abutting end is blocked in one buckling slot, so each limiting block is pushed to rotate by one buckling block. Each torsion spring is connected between one limiting block and the one buckling portion. The two torsion springs exert two forces on the two blocking ends of the two limiting blocks to make the two blocking ends of the two limiting blocks be blocked in the two blocking slots. When the two abutting ends of the two limiting blocks are pushed by the two buckling blocks, the two blocking ends of the two limiting blocks rotate to move out of the two blocking slots.

Another object of the present invention is to provide a plug connector. The plug connector includes a main body, two plug terminals mounted in the main body, two blocking ribs protruded from two sides of a top surface of the main body, a buckling lever, two buckling slots, two limiting grooves, two limiting blocks and two torsion springs. The buckling lever has a grip and two buckling portions. The grip is connected between the two buckling portions. The two buckling portions are rotatably connected to two outer side surfaces of the main body. The two buckling slots are disposed at two inner surfaces of the two buckling portions. Each buckling slot has an entrance. The entrance penetrates through a front surface of one buckling portion. The two limiting grooves are disposed at two outer surfaces of the two buckling portions. The two limiting grooves are communicated with the two entrances of the two buckling slots. The two limiting blocks are rotatably connected to the two buckling portions. The two limiting blocks are rotatably limited in the two limiting grooves. Each limiting block has an abutting end and a blocking end. A part of the abutting end is blocked in one entrance. Each torsion spring is connected between one limiting block and the one buckling portion. The two torsion springs exert two forces on the two limiting blocks to make the two blocking ends of the two limiting blocks be rotated to abut the two blocking ribs. When the two abutting ends of the two limiting blocks are pushed, the two limiting blocks with the two blocking ends are rotated, the two blocking ends of the two limiting blocks are apart away from the two blocking ribs.

As described above, the electrical connector assembly includes the plug connector, the socket connector and the two limiting blocks which are mounted to the plug connector, the two limiting blocks block the buckling lever when the plug connector is unconnected to the socket connector to prevent a connection between the plug connector and the socket connector from being blocked by the mistaken touching of the buckling structure which is the buckling lever.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
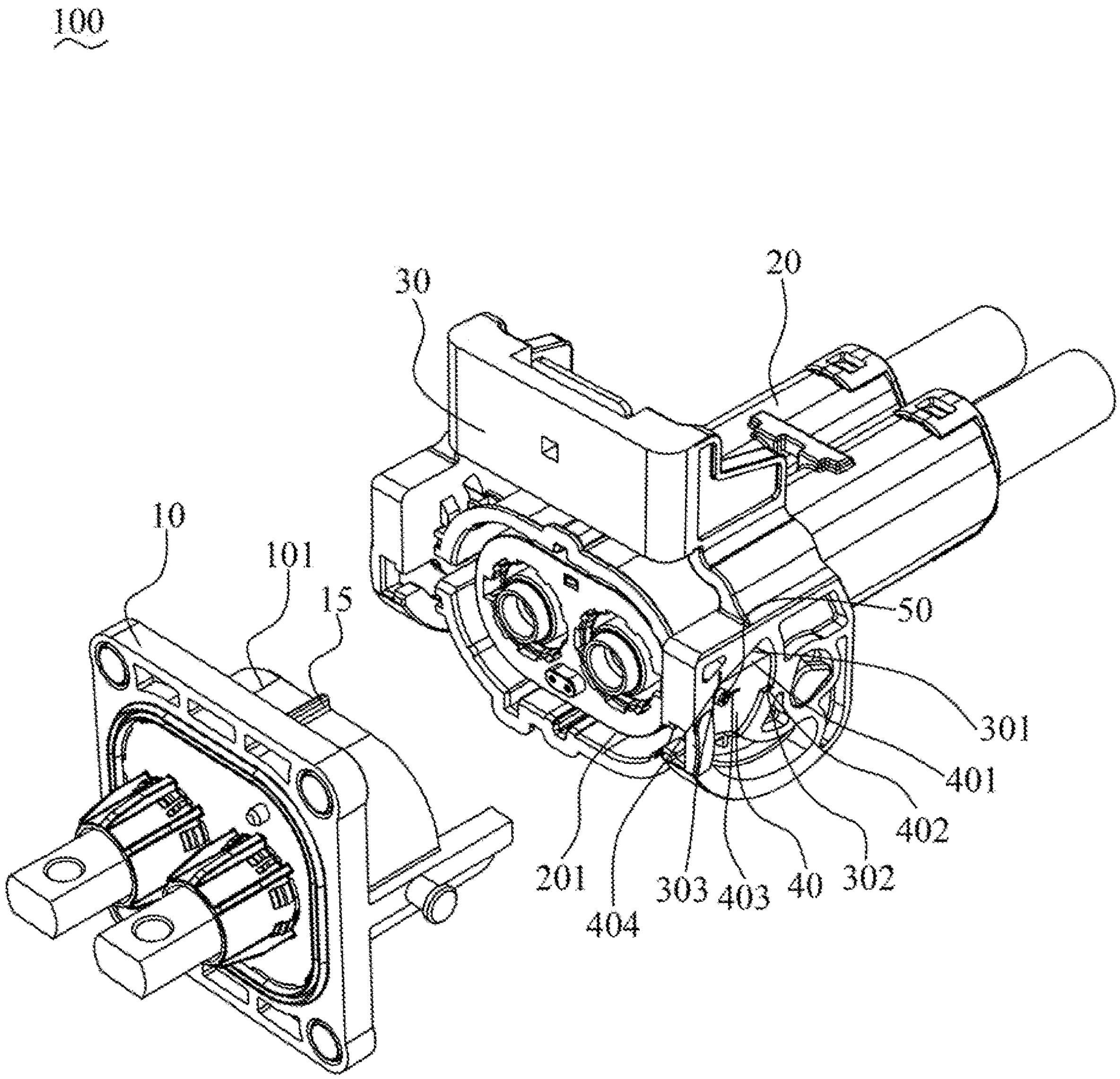
FIG. 1 is an exploded view of an electrical connector assembly in accordance with the present invention.

Referring to FIG. 1, an electrical connector assembly 100 in accordance with the present invention is shown. The electrical connector assembly 100 includes a socket connector 10 and a plug connector 20. The plug connector 20 is cooperated with the socket connector 10, and the plug connector 20 is connected with the socket connector 10.

Figure 2:
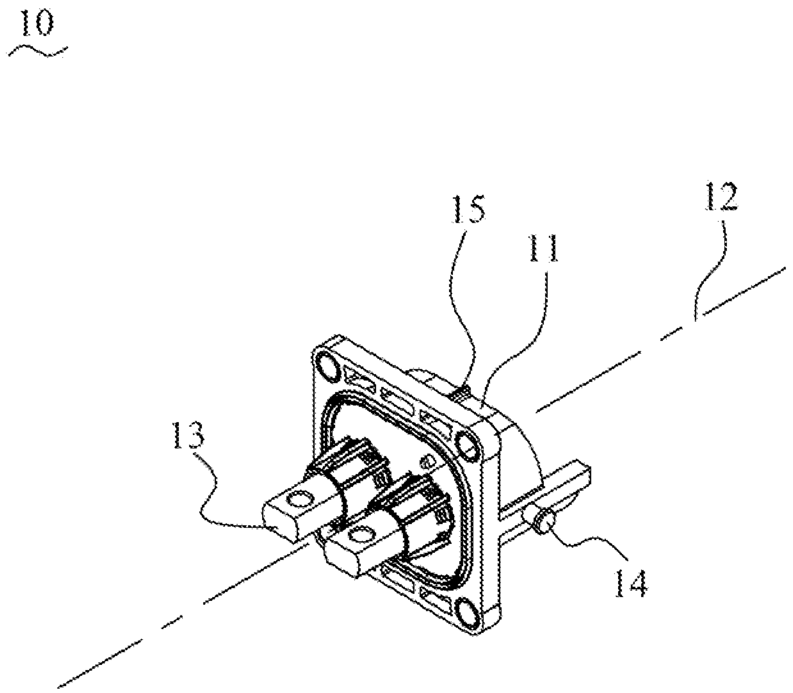
FIG. 2 is a perspective view of a socket connector of the electrical connector assembly in accordance with the present invention.
Figure 3:
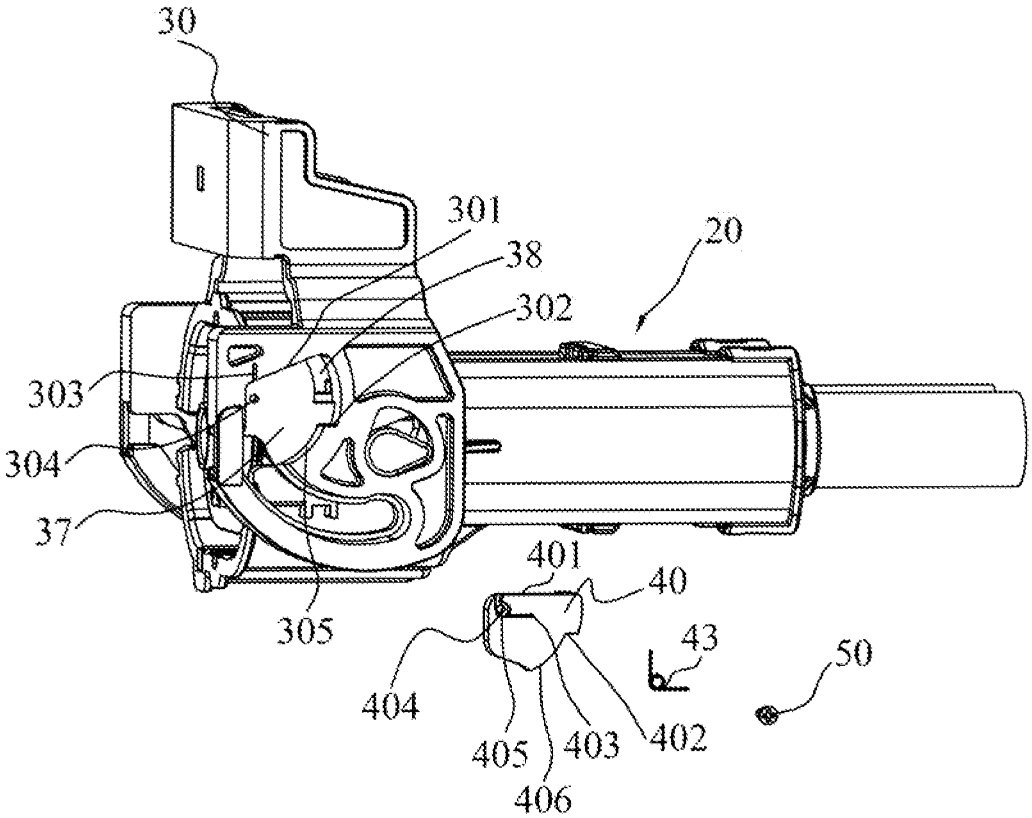
FIG. 3 is a partially exploded view of a plug connector of the electrical connector assembly in accordance with the present invention.
Figure 4:
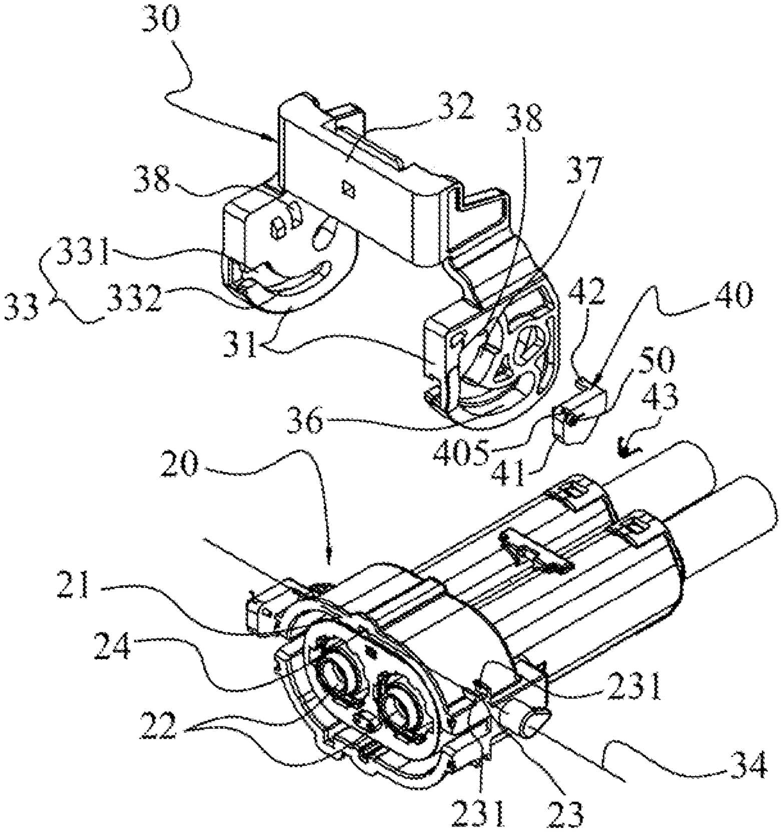
FIG. 4 is another partially exploded view of the plug connector of the electrical connector assembly in accordance with the present invention.
Figure 5:
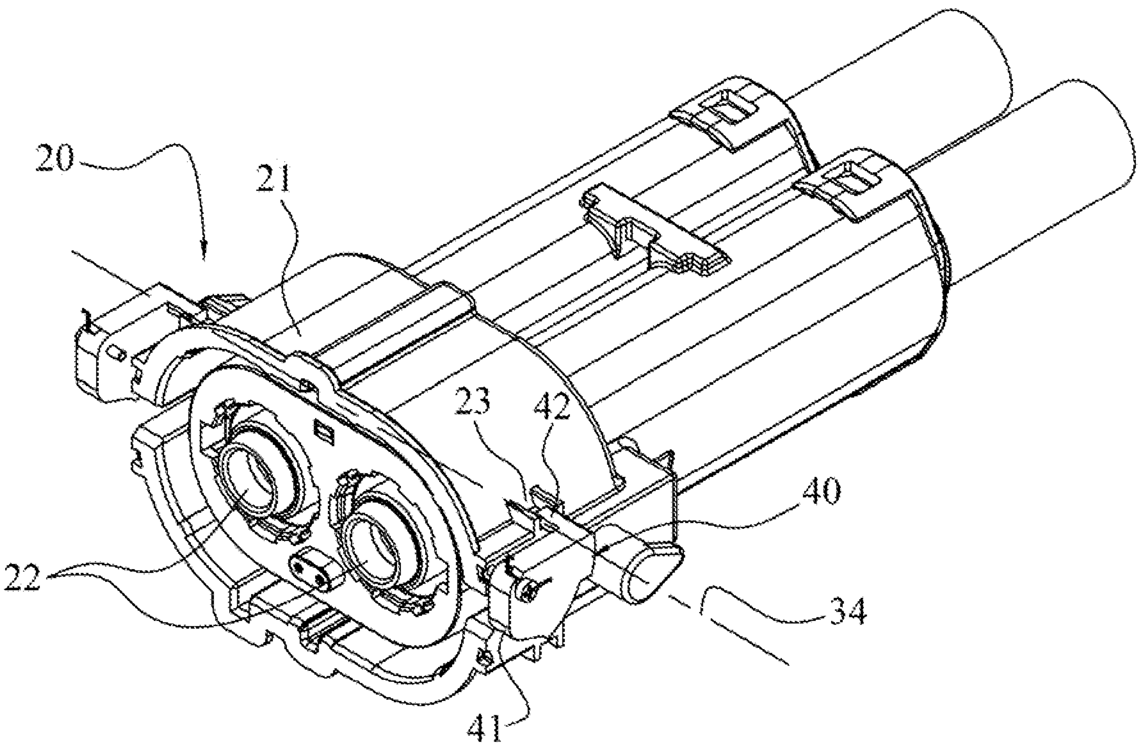
FIG. 5 is a schematic diagram showing that a buckling block of the electrical connector assembly prevents a buckling lever of the electrical connector assembly from being mistakenly touched according to the present invention.
Figure 6:
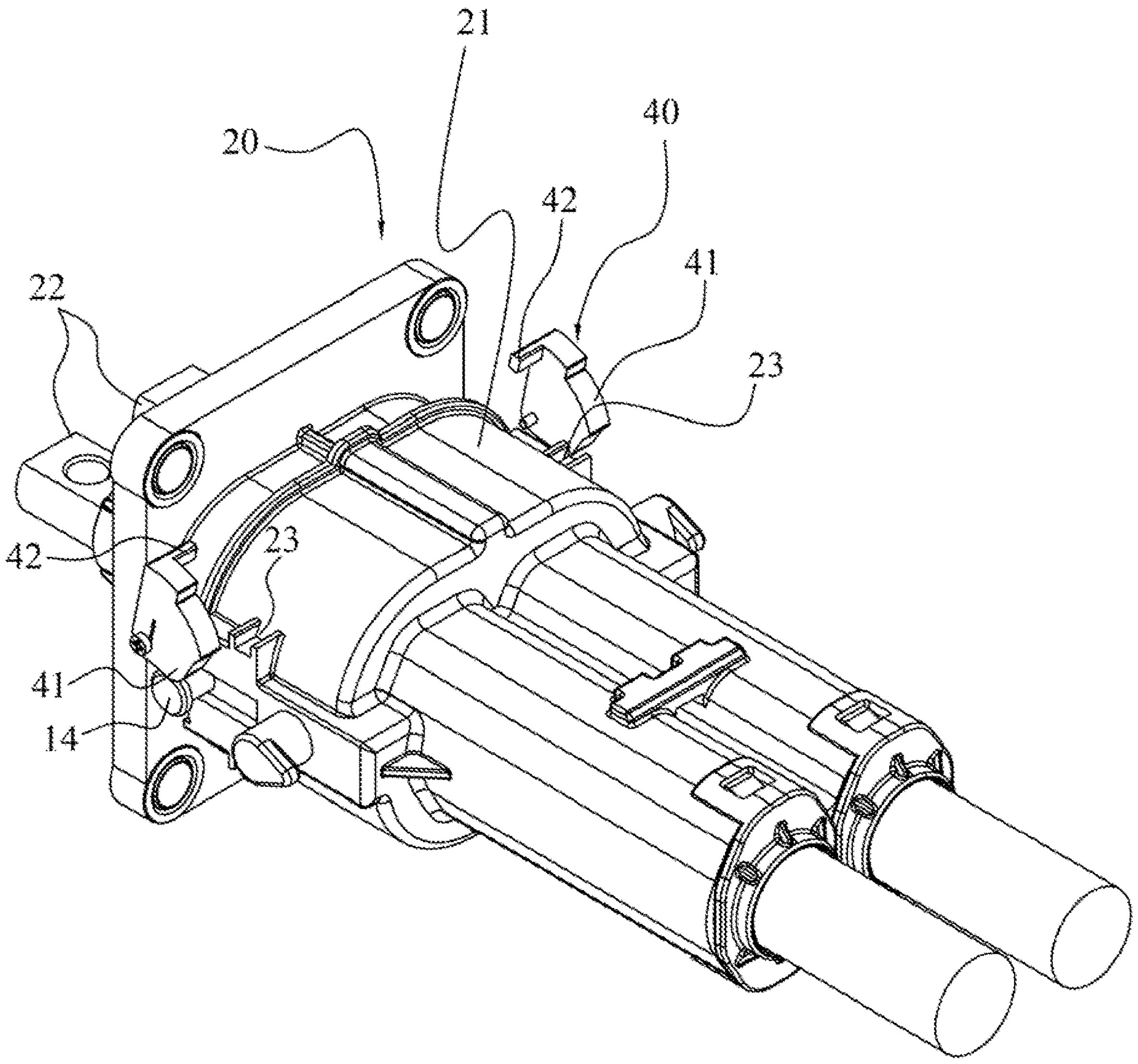
FIG. 6 is an illustration diagram showing that the plug connector is connected to the socket connector in accordance with the present invention.
Figure 7:
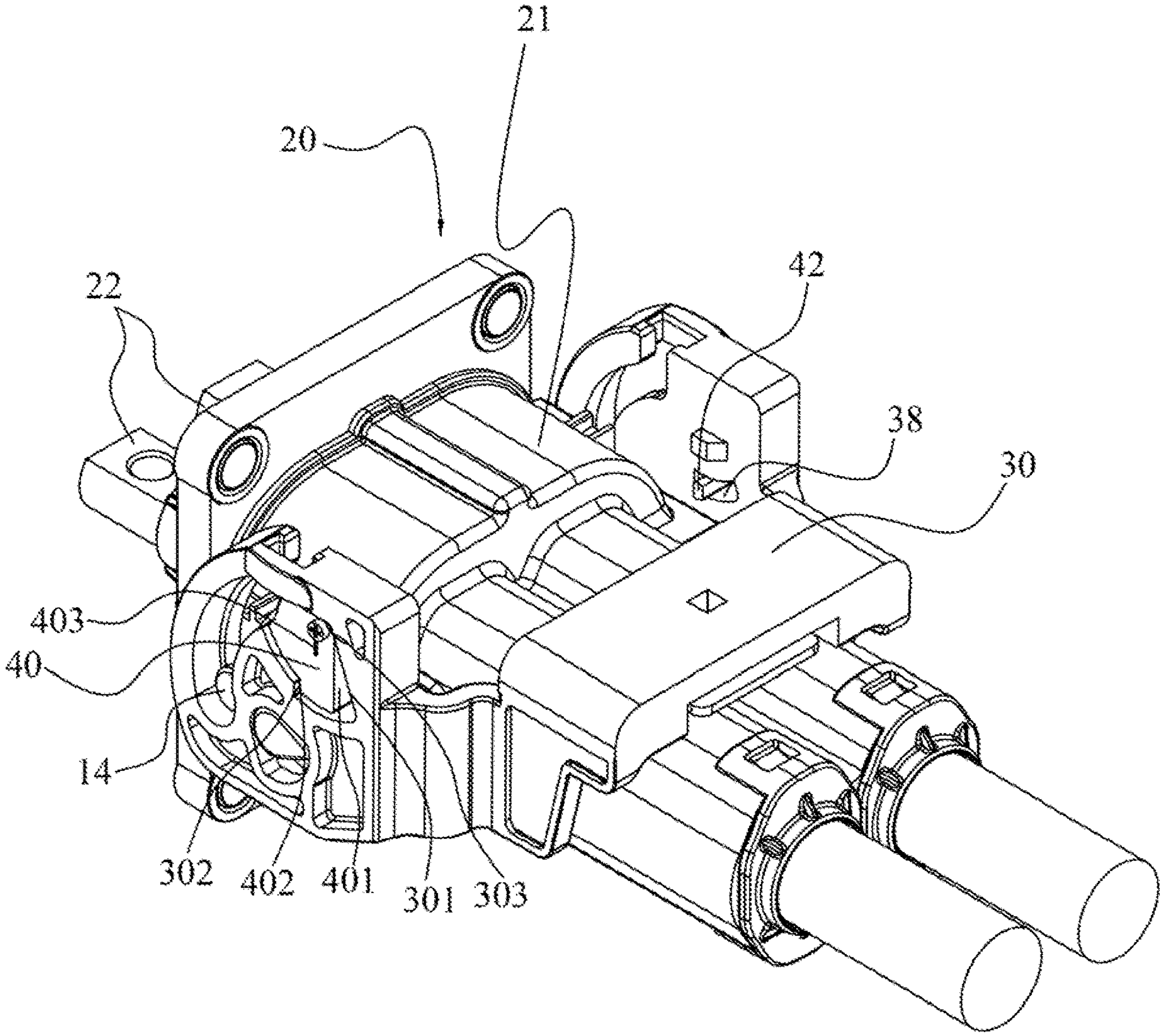
FIG. 7 is an illustration diagram showing that the buckling lever is pulled rearward from the plug connector of the electrical connector assembly in accordance with the present invention.

Referring to FIG. 2, the socket connector 10 includes a base body 11, two socket terminals 13 and two buckling blocks 14. A center of the socket connector 10 has an inserting axis 12 which extends longitudinally. The base body 11 is a symmetrical shape with respect to the inserting axis 12. The two socket terminals 13 are mounted in the base body 11. The two buckling blocks 14 are disposed at two outer side surfaces of the base body 11. Each buckling block 14 is a cylinder shape. A diameter of an outer end of each buckling block 14 is larger than a diameter of an inner end of each buckling block 14.

Referring to FIG. 3 to FIG. 7, the plug connector 20 in accordance with a preferred embodiment of the present invention is shown. The plug connector 20 includes a main body 21 which is configured to be connected with the base body 11, two plug terminals 22 mounted in the main body 21, a buckling lever 30, two limiting blocks 40, two torsion springs 43 and a bolt 50. The two limiting blocks 40 are mounted to two sides of the main body 21 of the plug connector 20. The buckling lever 30 is formed in an inverted U shape. Two sides of the buckling lever 30 are symmetrical to each other with respect to a center axis of the buckling lever 30 which extends vertically. The buckling lever 30 has a grip 32 and two buckling portions 31. The grip 32 is disposed vertically. The grip 32 is connected between the two buckling portions 31. The grip 32 is a lying U shape. A mouth of the grip 32 faces rearward. Two bottoms of two sides of the grip 32 slantwise extend downward and outward, and then extend downward to form the two buckling portions 31. The two buckling portions 31 are rotatably connected to two outer side surfaces of the main body 21, so that a pivot axis 34 of the buckling lever 30 extends transversely, the pivot axis 34 of the buckling lever 30 is perpendicular to the inserting axis 12 of the socket connector 10. The pivot axis 34 of the buckling lever 30 is perpendicular to an inserting direction of the socket connector 10.

The two plug terminals 22 are connected with the two socket terminals 13. Two lower portions of the two buckling portions 31 have two buckling slots 33. The two buckling slots 33 transversely penetrate through two inner surfaces of the two buckling portions 31 and two inner sides of two front surfaces of the two buckling portions 31. The two buckling slots 33 are disposed at the two inner surfaces of the two buckling portions 31 which are adjacent to two sides of the socket connector 10. Each buckling slot 33 includes a straight slot 331 and an arc slot 332. Each buckling slot 33 has an entrance, and the entrance penetrate through a front surface of one buckling portion 31. The straight slot 331 is defined as the entrance of the buckling slot 33. A top of each buckling slot 33 is defined as the straight slot 331 extending longitudinally to the front surface of the one buckling portion 31, and the straight slot 331 is connected to a front edge of the one buckling portion 31. The two straight slots 331 are aligned with the two buckling blocks 14 of the socket connector 10. A tail end of each straight slot 331 is arched opposite to the grip 32 to form the arc slot 332. Two outer sides of the two buckling slots 33 extend oppositely and expand outward to form two locking slots 36 penetrating through two outer surfaces of the two buckling portions 31. Two upper portions of the two outer surfaces of the two buckling portions 31 are recessed inward to form two limiting grooves 37. The two buckling portions 31 have two arc-shaped through holes 38 connected with the two limiting grooves 37. The two through holes 38 transversely penetrate through the two buckling portions 31. The two limiting grooves 37 are disposed at the two outer surfaces of the two buckling portions 31. The two limiting grooves 37 are communicated with the two entrances of the two buckling slots 33.

The two limiting blocks 40 are rotatably limited in the two limiting grooves 37. An upper wall of each limiting groove 37 is recessed inward to form a first restricting slot 303. An inner surface of the upper wall of each limiting groove 37 is defined as a first abutting surface 301. A lower portion of a rear wall of each limiting groove 37 is located in front of an upper portion of the rear wall of each limiting groove 37, so a top surface of the lower portion of the rear wall of each limiting groove 37 is defined as a second abutting surface 302. Two portions of two inner walls of the two limiting grooves 37 opposite to the two limiting blocks 40 are recessed inward to form two pivot holes 304.

A top surface of each limiting block 40 is defined as a first contacting surface 401. The first contacting surface 401 is matched with the first abutting surface 301. A lower portion of a rear of each limiting block 40 is located in front of an upper portion of the rear of each limiting block 40, so a bottom surface of the upper portion of the rear of each limiting block 40 is defined as a second contacting surface 402. The second contacting surface 402 is matched with the second abutting surface 302. A front of a side surface of each limiting block 40 is recessed inward to form a locating groove 404. A top of the locating groove 404 extends to a top surface of the limiting block 40. The top of the locating groove 404 extends to the first contacting surface 401. A bottom of the locating groove 404 extends rearward to form a second restricting slot 403. The two limiting blocks 40 have two penetrating holes 405 transversely penetrating through the two limiting blocks 40. Two middles of two side walls of the two locating grooves 404 define the two penetrating holes 405 transversely penetrating through the two limiting blocks 40. The two penetrating holes 405 are communicated with two middles of the two locating grooves 404.

The two torsion springs 43 are located in the two locating grooves 404 of the two limiting blocks 40. The two bolts 50 pass through two middles of the two torsion springs 43 and the two penetrating holes 405. The two bolts 50 are inserted into the two pivot holes 304. One end of each torsion spring 43 projects out of one locating groove 404 through the top of the one locating groove 404. The one end of each torsion spring 43 is restricted in the first restricting slot 303. The other end of each torsion spring 43 is restricted in the second restricting slot 403. Two free ends of each torsion spring 43 are restricted in the first restricting slot 303 and the second restricting slot 403. The two abutting ends 41 of the two limiting blocks 40 are pushed to rotate towards the two first abutting surfaces 301 of the two limiting grooves 37 until the two first contacting surfaces 401 of the two limiting blocks 40 abut against the two first abutting surfaces 301 of the two limiting grooves 37.

When the socket connector 10 is connected to the plug connector 20, the two buckling blocks 14 of the socket connector 10 are accommodated in the two straight slots 331. The two plug terminals 22 are matched with the two socket terminals 13. The two buckling blocks 14 of the socket connector 10 enter the two buckling slots 33 through the two straight slots 331. The two buckling blocks 14 are slidable in the two arc slots 332. Two free ends of the two buckling blocks 14 project into the two locking slots 36. The two limiting grooves 37 are connected with the two locking slots 36.

The main body 21 has two blocking slots 23 penetrating through two sides of a top surface of the main body 21. The two blocking slots 23 are disposed at two sides of an outer surface of the main body 21. Each blocking slot 23 is opened upwardly. Each blocking slot 23 is defined between two blocking ribs 231. The two blocking ribs 231 are protruded upward from the two sides of the top surface of the main body 21. The two limiting blocks 40 are rotatably connected to the two buckling portions 31. Each limiting block 40 has an abutting end 41 and a blocking end 42. A part of the abutting end 41 of each limiting block 40 is blocked in one entrance of one buckling slot 33 and one locking slot 36, so each limiting block 40 is pushed to rotate by one buckling block 14. The two blocking ends 42 of the two limiting blocks 40 pass through the two limiting grooves 37 and the two through holes 38. The two blocking ends 42 of the two limiting blocks 40 are blocked in or apart away from the two blocking slots 23. The two second contacting surfaces 402 of the two limiting blocks 40 abut against the two second abutting surfaces 302 of the two limiting grooves 37 when the two blocking ends 42 of the two limiting blocks 40 are rotated to abut against the two blocking ribs 231. Front surfaces of the two limiting blocks 40 abut against front walls of the two limiting groove 37 when the two blocking ends 42 of the two limiting blocks 40 are rotated to abut against the two blocking ribs 231. Each torsion spring 43 is connected between one limiting block 40 and the one buckling portion 31. The two torsion springs 43 exert two forces on the two blocking ends 42 of the two limiting blocks 40 to make the two blocking ends 42 of the two limiting blocks 40 be blocked in the two blocking slots 23. The two torsion springs 43 exert the two forces on the two limiting blocks 40 to make the two blocking ends 42 of the two limiting blocks 40 be rotated to abut the two blocking ribs 231. When the two abutting ends 41 of the two limiting blocks 40 are pushed by the two buckling blocks 14, the two blocking ends 42 of the two limiting blocks 40 rotate to move out of the two blocking slots 23. When the two abutting ends 41 of the two limiting blocks 40 are pushed, the two limiting blocks 40 with the two blocking ends 42 are rotated, the two blocking ends 42 of the two limiting blocks 40 are apart away from the two blocking ribs 231.

Referring to FIG. 1 to FIG. 4, in the preferred embodiment, an inside of the main body 21 has an insertion space 201 penetrating through a front surface of the main body 21. A middle of an inner surface of a top of the main body 21 is recessed inward to form a guiding slot 24. A middle of an inner surface of a top wall of the insertion space 201 is recessed inward to form the guiding slot 24. The base body 11 has an insertion end 101 facing the insertion space 201. The insertion end 101 is matched with the insertion space 201. A middle of a top surface of the insertion end 101 protrudes upward to form a guiding block 15 matched with the guiding slot 24. When the plug connector 20 is connected with the socket connector 10, the insertion end 101 is inserted into the insertion space 201, the guiding block 15 is guided in the guiding slot 24, the plug connector 20 and the socket connector 10 keep a stable connection between the plug connector 20 and the socket connector 10 by a cooperation of the guiding slot 24 and the guiding block 15.

Referring to FIG. 1 to FIG. 7, in order to make the two buckling blocks 14 of the electrical connector assembly 100 prevent the buckling lever 30 of the electrical connector assembly 100 from being mistakenly touched, specific steps of an action process of preventing a connection of the electrical connector assembly 100 from being blocked by a mistaken touching of a buckling structure which is the buckling lever 30 are described as follows.

Referring to FIG. 1 to FIG. 5, when the plug connector 20 is unconnected with the socket connector 10, the grip 32 is disposed vertically, the two torsion springs 43 exert the two forces on the two blocking ends 42 of the two limiting blocks 40 to push the two limiting blocks 40 to rotate downward, and therefore the two blocking ends 42 of the two limiting blocks 40 move downward and move into the two blocking slots 23, and the two abutting ends 41 of the two limiting blocks 40 move into the two buckling slots 33. At the moment, the two blocking ends 42 of the two limiting blocks 40 are blocked in the two blocking slots 23 to prevent the buckling lever 30 from being pulled rearward and opposite to the socket connector 10. The two abutting ends 41 of the two limiting blocks 40 which are pushed by the two forces of the two torsion springs 43 abut against two inner surfaces of two front walls of the two limiting grooves 37. The two limiting blocks 40 have two cam surfaces 406 positioned between the two abutting ends 41 and the two blocking ends 42 of the two limiting blocks 40. Walls of the two limiting grooves 37 have two step surfaces 305. User judges whether the two blocking ends 42 of the two limiting blocks 40 are blocked in the two blocking slots 23 by inspecting connection states between the two cam surfaces 406 and the two step surfaces 305. When the two blocking ends 42 of the two limiting blocks 40 are rotated to abut against the two blocking ribs 231, the two step surfaces 305 are mated with the two cam surfaces 406. The one end of each torsion spring 43 is connected to an area of one buckling portion 31 where is located to a top of one corresponding limiting groove 37. The other end of each torsion spring 43 is connected to the one limiting block 40.

Referring to FIG. 1 to FIG. 7, when the plug connector 20 is inserted into the socket connector 10, the two buckling blocks 14 move into the two straight slots 331 of the two buckling slots 33 and two initial ends of the two locking slots 36, and the two buckling blocks 14 push the two abutting ends 41 of the two limiting blocks 40 to rotate upward so as to make the two blocking ends 42 of the two limiting blocks 40 move upward and move away from the two blocking slots 23. When the two abutting ends 41 of the two limiting blocks 40 are pushed to make the two blocking ends 42 of the two limiting blocks 40 move out of the two blocking slots 23, the two blocking ends 42 of the two limiting blocks 40 move to two upper portions of the two arc-shaped through holes 38, the two first contacting surfaces 401 of the two limiting blocks 40 move towards the two first abutting surfaces 301 of the two buckling levers 30 until the two first contacting surfaces 401 of the two limiting blocks 40 abut against the two first abutting surfaces 301 of the two buckling levers 30, and the two second contacting surfaces 402 of the two limiting blocks 40 break away from the two second abutting surfaces 302 of the two buckling levers 30, the buckling lever 30 is pulled rearward and towards a rear end of the top surface of the main body 21, at the moment, the two buckling blocks 14 are gradually guided into the two arc slots 332, the two buckling blocks 14 break away from the two limiting blocks 40, the two blocking ends 42 of the two limiting blocks 40 move to two lower portions of the two arc-shaped through holes 38, the two first contacting surfaces 401 of the two limiting blocks 40 break away from the two first abutting surfaces 301 of the two buckling levers 30, the two second contacting surfaces 402 of the two limiting blocks 40 abut against the two second abutting surfaces 302 of the two buckling levers 30, and the two buckling blocks 14 are movably locked to two tail ends of the two locking slots 36, so that the grip 32 of the buckling lever 30 is free to be pulled rearward and towards the rear end of the top surface of the main body 21, the grip 32 is horizontally disposed to the rear end of the top surface of the main body 21.

As described above, the electrical connector assembly 100 includes the plug connector 20, the socket connector 10 and the two limiting blocks 40 which are mounted to the plug connector 20, the two limiting blocks 40 block the buckling lever 30 when the plug connector 20 is unconnected to the socket connector 10 to assure a position of the bucking lever 30 and prevent a connection between the plug connector 20 and the socket connector 10 from being blocked by the mistaken touching of the buckling structure which is the buckling lever 30.

What is claimed is:

1. An electrical connector assembly, comprising:

a socket connector including:

a base body;

two socket terminals mounted in the base body; and two buckling blocks disposed at two outer side surfaces of the base body;

a plug connector cooperated with the socket connector, the plug connector being connected with the socket connector, the plug connector including:

a main body which is configured to be connected with the base body;

two plug terminals mounted in the main body;

a buckling lever having a grip and two buckling portions, the grip being connected between the two buckling portions, the two buckling portions being rotatably connected to two outer side surfaces of the main body;

two buckling slots disposed at two inner surfaces of the two buckling portions which are adjacent to two sides of the socket connector, each buckling slot including a straight slot and an arc slot, a tail end of each straight slot being arched opposite to the grip to form the arc slot, a top of each buckling slot being defined as the straight slot extending to a front surface of one buckling portion, and the straight slot being connected to a front edge of the one buckling portion, the two straight slots being aligned with the two buckling blocks, when the socket connector is connected to the plug connector, the two buckling blocks of the socket connector being accommodated in the two straight slots;

two blocking slots disposed at two sides of an outer surface of the main body;

two limiting blocks rotatably connected to the two buckling portions, each limiting block having an abutting end and a blocking end, a part of the abutting end being accommodated in one buckling slot, so each limiting block being pushed to rotate by one buckling block; and two torsion springs, each torsion spring being connected between one limiting block and the one buckling portion, the two torsion springs exerting two forces on the two blocking ends of the two limiting blocks to make the two blocking ends of the two limiting blocks be blocked in the two blocking slots, when the two abutting ends of the two limiting blocks are pushed by the two buckling blocks, the two blocking ends of the two limiting blocks rotating to move out of the two blocking slots.

2. The electrical connector assembly as claimed in claim 1, wherein a pivot axis of the buckling lever extends transversely, the pivot axis of the buckling lever is perpendicular to an inserting direction of the socket connector.

3. The electrical connector assembly as claimed in claim 1, wherein the buckling lever is formed in an inverted U shape, two sides of the buckling lever are symmetrical to each other with respect to a center axis of the buckling lever.

4. The electrical connector assembly as claimed in claim 1, wherein the grip is disposed vertically, the grip is a lying U shape, a mouth of the grip faces rearward, two bottoms of two sides of the grip slantwise extend downward and outward, and then extend downward to form the two buckling portions.

5. The electrical connector assembly as claimed in claim 1, wherein a middle of an inner surface of a top of the main body is recessed inward to form a guiding slot, an inside of the main body has an insertion space penetrating through a front surface of the main body, the base body has an insertion end facing the insertion space, the insertion end is matched with the insertion space, a middle of a top surface of the insertion end protrudes upward to form a guiding block matched with the guiding slot, when the plug connector is connected with the socket connector, the insertion end is inserted into the insertion space, the guiding block is guided in the guiding slot.

6. The electrical connector assembly as claimed in claim 1, wherein two outer sides of the two buckling slots extend oppositely and expand outward to form two locking slots penetrating through two outer surfaces of the two buckling portions, the two buckling blocks are slidable in the two arc slots, two free ends of the two buckling blocks project into the two locking slots.

7. The electrical connector assembly as claimed in claim 6, wherein two upper portions of the two outer surfaces of the two buckling portions are recessed inward to form two limiting grooves, the two limiting grooves are connected with the two locking slots, the two limiting blocks are rotatably limited in the two limiting grooves.

8. The electrical connector assembly as claimed in claim 7, wherein the two buckling portions have two through holes connected with the two limiting grooves, the two through holes transversely penetrate through the two buckling portions, the two blocking ends of the two limiting blocks pass through the two limiting grooves and the two through holes, the two blocking ends of the two limiting blocks are blocked in or apart away from the two blocking slots.

9. An electrical connector assembly, comprising:

a socket connector including:

a base body;

two socket terminals mounted in the base body; and two buckling blocks disposed at two outer side surfaces of the base body;

a plug connector cooperated with the socket connector, the plug connector being connected with the socket connector, the plug connector including:

a main body which is configured to be connected with the base body;

two plug terminals mounted in the main body;

a buckling lever having a grip and two buckling portions, the grip being connected between the two buckling portions, the two buckling portions being rotatably connected to two outer side surfaces of the main body;

two buckling slots disposed at two inner surfaces of the two buckling portions which are adjacent to two sides of the socket connector, two outer sides of the two buckling slots extending oppositely and expanding outward to form two locking slots penetrating through two outer surfaces of the two buckling portions, each buckling slot including a straight slot and an arc slot, a tail end of each straight slot being arched opposite to the grip to form the arc slot, a top of each buckling slot being defined as the straight slot extending to a front surface of one buckling portion, and the straight slot being connected to a front edge of the one buckling portion, the two straight slots being aligned with the two buckling blocks, when the socket connector is connected to the plug connector, the two buckling blocks of the socket connector entering the two buckling slots through the two straight slots, the two buckling blocks being slidable in the two arc slots, two free ends of the two buckling blocks projecting into the two locking slots;

two blocking slots disposed at two sides of an outer surface of the main body;

two limiting blocks rotatably connected to the two buckling portions, each limiting block having an abutting end and a blocking end, a part of the abutting end being blocked in one buckling slot, so each limiting block being pushed to rotate by one buckling block; and two torsion springs, each torsion spring being connected between one limiting block and the one buckling portion, the two torsion springs exerting two forces on the two blocking ends of the two limiting blocks to make the two blocking ends of the two limiting blocks be blocked in the two blocking slots, when the two abutting ends of the two limiting blocks are pushed by the two buckling blocks, the two blocking ends of the two limiting blocks rotating to move out of the two blocking slots.

10. A plug connector, comprising:

a main body;

two plug terminals mounted in the main body;

two blocking ribs protruded from two sides of a top surface of the main body;

a buckling lever having a grip and two buckling portions, the grip being connected between the two buckling portions, the two buckling portions being rotatably connected to two outer side surfaces of the main body;

two buckling slots disposed at two inner surfaces of the two buckling portions, each buckling slot having an entrance, the entrance penetrating through a front surface of one buckling portion;

two limiting grooves disposed at two outer surfaces of the two buckling portions, the two limiting grooves being communicated with the two entrances of the two buckling slots;

two limiting blocks rotatably connected to the two buckling portions, the two limiting blocks being rotatably limited in the two limiting grooves, each limiting block having an abutting end and a blocking end, a part of the abutting end being blocked in one entrance; and two torsion springs, each torsion spring being connected between one limiting block and the one buckling portion, the two torsion springs exerting two forces on the two limiting blocks to make the two blocking ends of the two limiting blocks be rotated to abut the two blocking ribs;

wherein when the two abutting ends of the two limiting blocks are pushed, the two limiting blocks with the two blocking ends are rotated, the two blocking ends of the two limiting blocks are apart away from the two blocking ribs.

11. The plug connector as claimed in claim 10, wherein an inner surface of an upper wall of each limiting groove is defined as a first abutting surface, a top surface of each limiting block is defined as a first contacting surface, the first contacting surface is matched with the first abutting surface, the two abutting ends of the two limiting blocks are pushed to rotate towards the two first abutting surfaces of the two limiting grooves until the two first contacting surfaces of the two limiting blocks abut against the two first abutting surfaces of the two limiting grooves.

12. The plug connector as claimed in claim 11, wherein a lower portion of a rear wall of each limiting groove is located in front of an upper portion of the rear wall of each limiting groove, so a top surface of the lower portion of the rear wall of each limiting groove is defined as a second abutting surface, a lower portion of a rear of each limiting block is located in front of an upper portion of the rear of each limiting block, so a bottom surface of the upper portion of the rear of each limiting block is defined as a second contacting surface, the second contacting surface is matched with the second abutting surface, the two second contacting surfaces of the two limiting blocks abut against the two second abutting surfaces of the two limiting grooves when the two blocking ends of the two limiting blocks are rotated to abut against the two blocking ribs.

13. The plug connector as claimed in claim 10, wherein the two limiting blocks have two cam surfaces positioned between the abutting ends and the blocking ends of the two limiting blocks, walls of the two limiting grooves have two step surfaces, when the two blocking ends of the two limiting blocks are rotated to abut against the two blocking ribs, the two step surfaces are mated with the two cam surfaces.

14. The plug connector as claimed in claim 10, wherein front surfaces of the two limiting blocks abut against front walls of the two limiting grooves when the two blocking ends of the two limiting blocks are rotated to abut against the two blocking ribs.

15. The plug connector as claimed in claim 10, wherein two portions of two inner walls of the two limiting grooves opposite to the two limiting blocks are recessed inward to form two pivot holes, the two limiting blocks have two penetrating holes transversely penetrating through the two limiting blocks, two bolts pass through the two torsion springs and the two penetrating holes, the two bolts are inserted into the two pivot holes.

16. The plug connector as claimed in claim 15, wherein a front of a side surface of each limiting block is recessed inward to form a locating groove, two middles of two side walls of the two locating grooves define the two penetrating holes transversely penetrating through the two limiting blocks, the two bolts pass through two middles of the two torsion springs and the two penetrating holes, the two penetrating holes are communicated with two middles of the two locating grooves.

17. The plug connector as claimed in claim 16, wherein an upper wall of each limiting groove is recessed inward to form a first restricting slot, a top of the locating groove extends to a top surface of the limiting block, a bottom of the locating groove extends rearward to form a second restricting slot, the two torsion springs are located in the two locating grooves of the two limiting blocks, one end of each torsion spring projects out of one locating groove through the top of the one locating groove, the one end of each torsion spring is restricted in the first restricting slot, the other end of each torsion spring is restricted in the second restricting slot, two free ends of each torsion spring are restricted in the first restricting slot and the second restricting slot.

* * * * *